(12) United States Patent
Ibrahim (10) Patent No.: US 11,658,915 B2
(45) Date of Patent: May 23, 2023

(54) MANAGEMENT, BY AN INTERMEDIATE DEVICE, OF THE QUALITY OF TRANSMISSION OF A DATA STREAM TO A MOBILE TERMINAL

(71) Applicant: ORANGE, Paris (FR)

(72) Inventor: Ghida Ibrahim, Amsterdam (NL)

(73) Assignee: ORANGE, Paris (FR)

( * ) Notice: Subject to any disclaimer, the term of this patent is extended or adjusted under 35 U.S.C. 154(b) by 854 days.

(21) Appl. No.: 15/314,907

(22) PCT Filed: Jun. 15, 2015

(86) PCT No.: PCT/FR2015/051574
§ 371 (c)(1),
(2) Date: Nov. 29, 2016

(87) PCT Pub. No.: WO2015/193597
PCT Pub. Date: Dec. 23, 2015

(65) Prior Publication Data
US 2017/0195242 A1 Jul. 6, 2017

(30) Foreign Application Priority Data
Jun. 16, 2014 (FR) .................................... 1455483

(51) Int. Cl.
*G06F 15/16* (2006.01)
*H04L 47/38* (2022.01)
(Continued)

(52) U.S. Cl.
CPC ............ *H04L 47/38* (2013.01); *H04L 65/762* (2022.05); *H04L 65/80* (2013.01);
(Continued)

(58) Field of Classification Search
CPC ....... H04L 47/38; H04L 65/602; H04L 65/80; H04N 21/2402; H04N 21/26216;
(Continued)

(56) References Cited

U.S. PATENT DOCUMENTS

2005/0091696 A1* 4/2005 Wolfe ............ H04N 21/234309
725/116
2006/0109915 A1* 5/2006 Unger ................. H04N 21/2343
375/240.27
(Continued)

FOREIGN PATENT DOCUMENTS

CA    2727255 A1 * 12/2009  ......... H04L 12/2865
EP    1324628 A1 *  7/2003  ............. H04L 47/14
(Continued)

OTHER PUBLICATIONS

A Video Quality-Estimation Model for Streaming Media Services Based on Human Visual System Dong Li;Meilin Cai 2009 International Conference on Computational Intelligence and Software Engineering (Year: 2009).*

(Continued)

*Primary Examiner* — Oscar A Louie
*Assistant Examiner* — Oluwatosin M Gidado
(74) *Attorney, Agent, or Firm* — Haverstock & Owens, A Law Corporation (57) ABSTRACT

The invention concerns a method for transmitting a piece of digital content consisting of a plurality of data packets to a mobile terminal (10), via a communication network (20), in which a management device (30) implements the obtaining (E11, E23, F8, F33), from the communication network, of at least one piece of information related to the bandwidth available on at least one link of the network to the mobile terminal, the selection (E12, E24, F10, F34), depending on said piece of information related to the bandwidth, of an (Continued)

encoding rate (RES) to use for at least one of said data packets, and the sending (E14, E25, F16, F38), to a device intended to provide the digital content (41), of a message indicating the selected encoding rate, in order to instruct the equipment intended to provide the digital content (41) to transmit, to the mobile terminal, at least one of the data packets, encoded with the selected encoding rate, on one of the network links.

10 Claims, 4 Drawing Sheets (51) Int. Cl.
*H04L 65/80* (2022.01)
*H04N 21/24* (2011.01)
*H04N 21/262* (2011.01)
*H04N 21/647* (2011.01)
*H04L 65/75* (2022.01)
*H04W 72/30* (2023.01)
*H04W 28/24* (2009.01)
*H04W 48/18* (2009.01)
*H04W 28/02* (2009.01)
*H04W 72/00* (2023.01)

(52) U.S. Cl.
CPC ... *H04N 21/2402* (2013.01); *H04N 21/26216* (2013.01); *H04N 21/64738* (2013.01); *H04W 72/30* (2023.01); *H04W 28/02* (2013.01); *H04W 28/24* (2013.01); *H04W 48/18* (2013.01); *H04W 72/00* (2013.01)

(58) Field of Classification Search
CPC ......... H04N 21/64738; H04W 72/005; H04W 28/02; H04W 28/24; H04W 48/18; H04W 72/00
USPC .................................................. 709/233, 223
See application file for complete search history.

(56) References Cited

U.S. PATENT DOCUMENTS

| | | | | |
|---|---|---|---|---|
| 2007/0177604 A1* | 8/2007 | Ozawa | ................ | H04L 47/2441 370/395.2 |
| 2008/0307108 A1* | 12/2008 | Yan | ..................... | H04L 65/1016 709/231 |
| 2009/0197683 A1* | 8/2009 | Svennebring | ....... | G07F 17/3232 463/43 |
| 2010/0118888 A1* | 5/2010 | Picco | .................... | H04J 3/0682 370/468 |
| 2011/0022682 A1* | 1/2011 | Zanger | ................ | H04N 21/238 709/219 |
| 2012/0147830 A1* | 6/2012 | Lohr | ..................... | H04L 1/1854 370/329 |
| 2012/0250509 A1 | 10/2012 | Leung et al. | | |
| 2012/0300018 A1* | 11/2012 | Li | ..................... | H04N 21/43615 348/14.09 |
| 2013/0044801 A1* | 2/2013 | Cote | .................... | H04N 19/146 375/240.01 |
| 2013/0073297 A1* | 3/2013 | Yu | ........................ | H04N 19/132 704/500 |
| 2014/0355624 A1* | 12/2014 | Li | ........................... | H04L 27/00 370/468 |
| 2017/0013081 A1* | 1/2017 | Tofts | ................... | H04L 67/2842 |

FOREIGN PATENT DOCUMENTS

| | | |
|---|---|---|
| EP | 2 557 753 A1 | 2/2013 |
| WO | 2013/057315 A2 | 4/2013 |
| WO | 2013085279 A1 | 6/2013 |
| WO | WO-2015023250 A1 * | 2/2015 ........... H04L 47/125 |

OTHER PUBLICATIONS

An Analysis of Resource Efficiency by Quality Management Messages in the Converged Wireless Networks Hyun-Jong Kim;Seong-Gon Choi;Kyounghee Lee;Hyunwoo Lee 2009 Fourth International Conference on Computer Sciences and Convergence Information Technology (Year: 2009).*

A framework managing quality of service contracts in distributed applications S. Lorcy;N. Plouzeau;J. Jezequel Proceedings. Technology of Object-Oriented Languages. TOOLS 26 (Cat. No. 98EX176) Year: 1998 | Conference Paper | Publisher: IEEE (Year: 1998).*

A framework managing quality of service contracts in distributed applications S. Lorcy;N. Plouzeau;J. Jezequel Proceedings. Technology of Object-Oriented Languages. TOOLS 26 (Cat. No. 98EX176) Year: 1998 | Conference Paper | Publisher: IEEE (Year: 1998) (Year: 2018).*

"3rd Generation Partnership Project; Technical Specification Group Services and System Aspects; Study on System enhancements for user plane congestion management (Release 13)", 3GPP TR 23.705, V0.11.0 (May 2014), 3GPP A Global Initiative, http//www.3gpp.org, pp. 1-64.

"Discussion paper on handling of video traffic", SA WG2 Meeting #S2-97, S2-131740, May 27-31, 2013, pp. 3.

3rd Generation Partnership Project; Technical Specification Group Services and System Aspects; Packet-switched Streaming Service (PSS); Improved Support for Dynamic Adaptive Streaming over HTTP in 3GPP (Release 12), 3GPP TR 26.938, V1.6.0 (Jan. 2014), pp. 78.

Janne Tervonen, "Deliverable DA2.2.23 Policy and Charging Control Functionality with WLAN and PBRM", Tivit Future Internet, Phase 2, 1.6.2009-31.12.2010, V1.0, www.futureinternet.fi.

Attached please find the Written Opinion of the International Search for the PCT/FR2015/051574 application.

* cited by examiner

MANAGEMENT, BY AN INTERMEDIATE DEVICE, OF THE QUALITY OF TRANSMISSION OF A DATA STREAM TO A MOBILE TERMINAL

The present invention concerns the field of transmission of multimedia data streams in a communication network, and more particularly to that of optimization of the quality of experience of a user when such a data stream is received.

The consumption of multimedia content on the Internet has been constantly increasing for years. In particular, the consumption of video content is expected to make up 90% of Internet traffic in 2017. In this video content traffic, it is estimated that 35% thereof will be generated by mobile terminals in 2015, this percentage being expected to increase to 50% up to 2017.

In contrast to users accessing the Internet via a fixed access network, users of mobile terminals can change geographical area (cell) or access network type (Wifi or cellular network) during a video session, giving rise to large bandwidth fluctuations on the radio access network (RAN).

Now, on the one hand, the quality of experience (QoE in English) received by an end user using his mobile terminal to access a multimedia content, typically via the Internet, is an essential parameter. This quality of experience, particularly when this end user consumes video content on the Internet, is dependent on the resolution of the video content, itself dependent on the encoding bit rate of the video stream consumed, and on "buffering" events that the end user has to put up with, which are dependent on the appropriateness between the encoding bit rate of a video and its transmission bit rate.

On the other hand, some content providers have their own content distribution networks (CDN) consisting of servers hosted in telecommunications operator areas or connected via peer-to-peer links to the networks of these operators (e.g. Netflix, YouTube). Other content providers have chosen to delegate distribution of their multimedia content to players that are specialized in content distribution, with their own CDN networks (e.g. Akamai, Limelight), which are also interconnected with the networks of the operators. Finally, some telecommunications operators use CDN networks (Telco CDNs) in overlay mode in countries in which they are present and, for this reason, are starting to attract content providers that wish to push their content closest to the users.

In all of these scenarios, there is a need to optimize the end-to-end quality of service for multimedia sessions initiated by a mobile subscriber of a telecommunications operator in order to access multimedia, particularly video, content provided by a content provider via a content distribution network. This is in order to provide this subscriber with the best possible quality of experience.

In order to improve the quality of experience of a user accessing a video content, there is already a technique known by the name of "http adaptive streaming", which is intended to work effectively on networks using the http protocol, such as the Internet.

This "http adaptive streaming" technique is based on the use, on the content distribution platform CDN, of an encoder that is able to encode the content to be broadcast using multiple encoding bit rates corresponding to different resolutions of the same content. Each stream is divided into a multitude of data packets, which are usually grouped in the form of data segments ("chunks" in English) whose length corresponds to a content duration that usually varies between two and ten seconds.

The client terminal knows the various streams available for a given multimedia content, with their various encoding bit rates, by means of a file (commonly called "manifest file") that it receives from the content provider at the time at which the content is demanded, this file listing all of the segments of the content according to the various available encoding resolutions. On startup, the client terminal always demands the first segment with the lowest encoding bit rate. If, on reception of this first segment, the client terminal notices that the reception bit rate is higher than this encoding bit rate, then it requests the next segment according to the encoding bit rate directly higher than the previously used bit rate. Later, if the client terminal notices that the reception bit rate is lower than the encoding bit rate on reception of a packet, then it requests the next segment according to the encoding bit rate directly lower than the previously used bit rate.

This "http adaptive streaming" technique thus allows "buffering" problems to be limited and the initial time for restoration of the content to be speeded up, which improves the quality of experience of the users. Apart from various proprietary versions (HTTP Smooth Streaming from Microsoft, HTTP Live Streaming from Adobe), this technique has led to a standardized solution, "MPEG DASH", allowing miscellaneous devices to receive content under various reception conditions.

The technical solution "MPEG DASH", and the other "http adaptive streaming" techniques that exist in a general manner, have a certain number of drawbacks, however.

Thus, the resolution (i.e. the encoding bit rate) selected at a given instant for a content is not always the best resolution that can be provided for the user by the network. This is the case particularly for the first segment, which is systematically transmitted at the lowest resolution even if network resources allowed transmission of a first segment at a higher resolution. This may also be the case for the next segment, which, in the best cases, can be encoded only with a resolution that is directly higher than the lowest possible resolution, and so on. In other words, at the crucial time of involvement of a client in terms of quality of experience, which is made up by the first segments of received data, the quality of encoding of the content is kept in check in relation to what it could be, particularly in networks providing good transmission conditions.

Moreover, the selection of the resolution is based not on a realtime view of the network, but rather on heuristics measured by the software restoring the content required by the user on his terminal. These heuristics are subject to failures on the terminal itself and to flaws in the adopted measurement method. In particular, these heuristics do not necessarily reflect the true state of the access network and of the core network. Finally, the resolution of a content is lowered only after a degradation in the network conditions is experienced by the user, which affects his quality of experience and therefore his loyalty.

There is admittedly a variant in which the "manifest file" file can be modified by the operator of the network in order to remove certain encoding bit rates that could not be supported by the network, taking into account network resources, so as to prevent the client terminal from selecting such bit rates.

However, this variant does not allow the aforementioned problems to be solved completely, and has other drawbacks. Firstly, the effectiveness of this variant is principally dependent on the frequency of update of the "manifest file" file by the provider of the content. Insofar as this frequency of update is dependent on the server providing the content and on the end user, adaptation of the resolution on the scale of the segment cannot be guaranteed. Moreover, the "manifest file" files being sent to the client terminal by the content provider, they must be detected and intercepted by the operator of the network in order to be able to be modified, which requires the use of complex and expensive deep packet inspection (DPI in English) techniques in the network. In particular, systematic inspection of each transmitted packet proves necessary in order to identify "manifest file" files corresponding to specific users and/or very specific content providers, which adds complexity and brings about huge constraints for the network.

The object of the present invention is to overcome the aforementioned drawbacks.

To this end, it provides a method for transmitting a digital content, composed of a plurality of data packets, to a mobile terminal via a communication network, the method comprising the following steps implemented by a management device:

obtaining, from the communication network, at least one piece of information relating to the available bandwidth on at least one network link to the mobile terminal;
  selecting, on the basis of this piece of information relating to the bandwidth, an encoding bit rate to be used for at least one of the data packets; and
  sending, to a device intended to provide the digital content, a message indicating the selected encoding bit rate, so as to instruct this equipment intended to provide the digital content to transmit to the mobile terminal at least one of the data packets, encoded using the selected encoding bit rate, on one of the network links.

It is thus possible to adapt the quality of encoding of the transmitted content, at the provider or the distributor of this content, on the basis of the bandwidth allocated by the network to the mobile terminal, and therefore to optimize the end-to-end quality of service for transmission of the content, so as to avoid particularly "buffering" events that affect the quality of experience of the user requesting the content.

According to one advantageous feature, the method moreover comprises:

determining, on the basis of the selected encoding bit rate, a quality of service rule to be applied to the network link on which the at least one data packet encoded by the selected encoding bit rate is to be transmitted; and
  sending this quality of service rule to a node for applying quality of service rules of the communication network, so as to trigger the sending, from this node for applying quality of service rules to a network access gateway, of at least one quality of service parameter, deduced from the quality of service rule, to be applied to the network link on which the at least one data packet encoded using the selected encoding bit rate is to be transmitted.

This makes it possible to guarantee a certain quality for the transmission on the basis of the resolution quality chosen for the digital content by allocating the resources, in terms of bandwidth, associated with a given resolution of the content on the access network and the core network forming the communication network.

In one advantageous embodiment, the at least one packet encoded using the selected encoding bit rate is a data segment comprising the first data packet of this content, the steps of the method being implemented by the management equipment following reception of a request to provide the content from the mobile terminal. This makes it possible to provide the user with an optimum quality of experience from the start of reception of the requested content, rather than at the end of a time that may be of greater or lesser length, and thus to increase the bit rate of development of customer loyalty to the service providing this content.

In one particular embodiment, the method moreover comprises the management equipment obtaining a resolution file from the device intended to provide the digital content, this resolution file indicating a plurality of available encoding bit rates for the packets of the digital content, the encoding bit rate to be used being selected from among the plurality of available encoding bit rates. This allows the management device to dynamically and simply select the resolution of the content, while optimizing end-to-end quality.

In one embodiment, the obtainment step consists in obtaining, from the node for applying quality of service rules, the piece of information relating to the available bandwidth on at least one network link by means of which the terminal is attached to the communication network.

In another embodiment, the obtainment step consists in obtaining, from an access network discovery and selection server of the communication network, a plurality of pieces of information relating to the available bandwidths for a plurality of network links from the network to the terminal, the method moreover comprises the selection, from among said network links, of the network link having the highest available bandwidth, and the step of selection of the encoding bit rate consists in selecting, from among a set of available encoding bit rates for the digital content, the highest encoding bit rate that is lower than the bandwidth of the selected network link.

It is thus possible to improve management of the end-to-end quality of the transmission of the content, by allowing a choice between multiple network links so as to provide the best digital content resolution for the user.

According to one particular feature, when the selected network link is a network link by means of which the mobile terminal is not attached to the mobile network, the method moreover comprises the sending, to the access network discovery and selection server, of an instruction for triggering a procedure of attachment by means of the selected network link between the mobile terminal and a network access gateway of the communication network.

It is thus possible to optimize management of the end-to-end quality of the transmission of the content, by activating, if need be, a network link for which the terminal is not undergoing attachment if this network link allows the best digital content resolution to be provided for the user.

According to one embodiment, the message sent to the device intended to provide the digital content is a request to send to the mobile terminal at least one of the data packets, encoded using the selected encoding bit rate, on one of the network links. This allows transparent management, for the user, of the resolution of the transmitted digital content, implemented entirely on the management equipment.

According to another embodiment, the message sent to the device intended to provide the digital content is a request to select at least one data packet encoded using the selected encoding bit rate when the device intended to provide the digital content receives from the mobile terminal a request to transmit the data packet, the method moreover comprising the sending, from the management equipment to the mobile terminal, of a message providing instruction to redirect a request to transmit data packets from the mobile terminal to the device intended to provide the digital content. This other embodiment allows management of the end-to-end quality of the transmission of the content involving the mobile terminal.

According to another aspect of the invention, a management device for managing transmission of a digital content composed of a plurality of data packets to a mobile terminal, via a communication network, is provided, comprising:

a communication module that is capable of obtaining, from the communication network, at least one piece of information relating to the available bandwidth on at least one network link from the network to the mobile terminal, and that is configured to send, to a device intended to provide the digital content, a message indicating an encoding bit rate to be used for at least one of the data packets, so as to instruct this equipment intended to provide the digital content to transmit to the mobile terminal at least one of the data packets, encoded using the selected encoding bit rate, on one of the network links; and a processing module that is configured to select, on the basis of this piece of information relating to the bandwidth, the encoding bit rate to be used for the at least one data packet.

A computer program comprising code instructions intended for implementation of the steps of the method above when this computer program is executed by the processing means of a device for managing transmission of a digital content is also provided. Finally, a recording medium, readable by a device for managing transmission of a digital content, on which is recorded such a computer program is also provided.

Other features and advantages of the invention will emerge on reading the detailed description below of particular embodiments, which are provided by way of non-limiting example, and the appended figures, in which.

Figure 1:
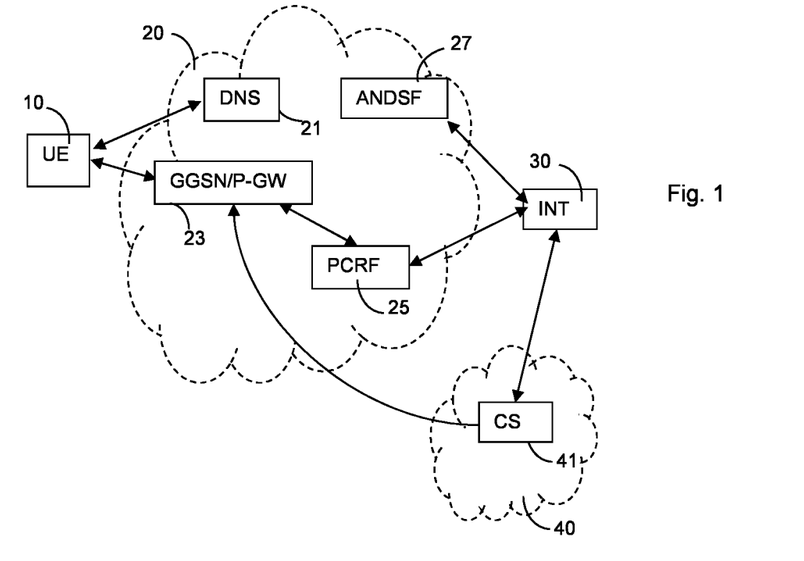
FIG. 1 illustrates a telecommunications system allowing management of the quality of the transmission of a digital content by an intermediate management device.

Reference will first of all be made to FIG. 1, which illustrates a telecommunications system allowing management of the quality of the transmission of a digital content by an intermediate management device.

In this system, a mobile terminal 10 (e.g. cellphone, smartphone, tablet or even a portable computer with a radio interface, etc.) can receive data streams corresponding to digital multimedia (e.g. audio or video) content or services from a device 41 intended to provide such content, this device 41 belonging to a content provider (for example YouTube or DailyMotion) or to a content distributor (CDN provider in English, for example Akamai or Limelight) 40. This device 41 is typically implemented in the form of a server storing multimedia content, or managing access to another device storing this content.

In order to access this content or these services, the mobile terminal 10 interacts with the telecommunication network 20 (typically the network of the telecommunications operator to which the user of the terminal 10 is subscribed) so as to receive the data streams corresponding to the content requested by the user.

This telecommunication network 20 comprises a (or even multiple) mobile access network(s) and a core network in which, among other devices, the following devices are used within the context of the present invention:

A network access gateway 23, allowing interaction between the network 20 and external packet switching networks (such as the Internet) and routing of the data packets between the terminal 10 and these external networks. This network access gateway 23 is typically a GGSN node in the case of a core network of GPRS type associated with 2G or 3G access networks, or a P-GW gateway in the case of a core network of EPC type associated with 4G/LTE access networks.

This gateway 23 thus allows the terminal 10 to receive data from external networks, by means of a network link set up between this gateway 23 and the terminal 10 via the core network and the access network to which the terminal 10 is attached via an access point or a base station. In the event of the network 20 providing multiple different access networks for the terminal 10, this terminal 10 can be connected to the gateway 23 via these different access networks, by means of multiple network links between the terminal 10 and the gateway 23 (i.e. one network link per different access network).

A node for applying quality of service rules 25, particularly allowing application of predefined quality of service (QoS) levels in the network 20. This node 25 is typically a PCRF node of the network 20, i.e. a device of the network implementing the PCRF function as provided in 3GPP standard TS 23.203.

Moreover, this telecommunication network 20 can comprise the following devices that can advantageously be used, as the case may be, within the context of the present invention:

An address resolution server 21 (typically a DNS server) allowing the network 20 to provide the terminal 10 requesting access to a content or a service by means of an Internet address (e.g. URL) with the IP address of the device capable of providing this content or this service.

An access network discovery and selection server 27, allowing the terminal 10 to discover the access networks that it can access and capable of providing this terminal 10 with preference rules in terms of connection to the various accesses and routing of the various streams (data, voice, video) via these accesses. Within the context of a 4G core network (EPC), this server 27 is typically an ANDSF (Access Network Discovery and Selection Function) server as described in 3GPP standard TS 24.312.

In order to implement the method according to the invention, the network 20 interacts with the device 41 by means of an intermediate management device 30, typically implemented in the form of a server, which is positioned as a trusted third party between the operator of the network 20 and the content provider/distributor 40.

To do this, the operator of the network 20 and the content provider/distributor 40 (if the network operator is not itself a content distributor) can open up access to some of their functionalities to this device 30, via specific programming interfaces (network API), so that this device 30 can obtain a certain number of pieces of information, both from the network 20 and from the content provider/distributor 40, and send instructions thereto when necessary in order to manage the transmission quality of a content. This intermediate management device 30 thus becomes an orchestrator of the control plan of the operator. It interacts with the device 41 and dynamically supervises the access and core networks of the telecommunications operator, so as to optimize delivery of a content.

Figure 2:
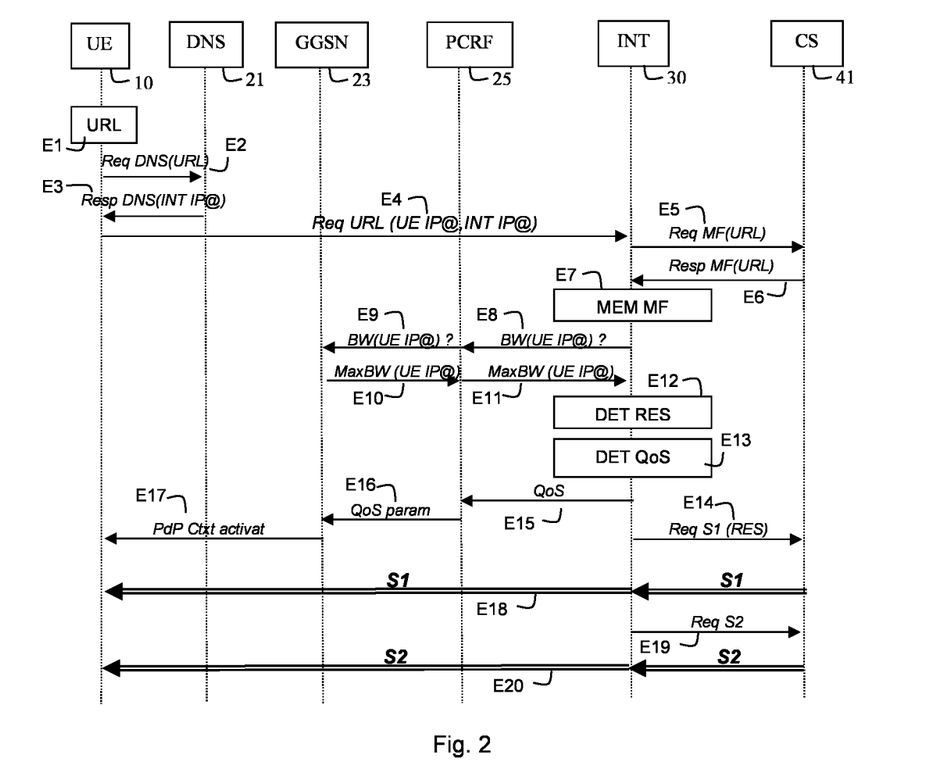
FIG. 2 illustrates a method for transmitting a digital content to a mobile terminal according to a first embodiment of the invention.

Reference is now made to FIG. 2, which illustrates a method for transmitting a digital content to a mobile terminal according to a first embodiment.

In this first embodiment, a generic case in which the terminal 10 is attached via one or more access networks to a network access gateway 23 is considered (FIG. 2 illustrating the particular case of an attachment by a single network link, for the sake of simplicity, without the invention being limited to this particular single case), this gateway being able to be a GGSN gateway belonging to a 2G/3G core network (GPRS), as illustrated in FIG. 2, or a P-GW gateway belonging to a 4G core network (EPC).

The method is triggered (step E1) by a user when he uses his terminal 10 to request access to a content C1 provided by the provider 40, typically by indicating the Internet address (URL) of this content C1 in an Internet browser installed on this terminal 10 (for example "www.youtube.com/C1"). Such a content C1 is made available, by a device 41 of the content provider/distributor 40, in the form of a succession of data packets P1, P2, . . . , so as to allow transmission of the content C1 in a packet communication network. These data packets of the content C1 can be assembled in segments ("chunks") of data S1, S2, . . . , of a duration perceptible to the user (typically of the order of a few seconds), particularly when the content C1 is being transmitted by segments in a broadcast mode of "streaming" type, which is the case illustrated subsequently in this FIG. 2.

The terminal 10 is then directed to the management entity 30, for example by means of an address resolution server 21 of the network 20, in which the IP address of the management entity 30 has been associated with a certain number of URLs belonging to content providers/distributors, having subscribed beforehand to a service for managing quality of service on the intermediate management device 30, for example.

To do this, the terminal 10 requests in conventional fashion, from the address resolution server 21, translation of this Internet address into an IP address, by sending this server 21 an address resolution request (step E2) containing the Internet address of the content C1. The server 21 responds to this request by returning (step E3) to the terminal 10 not the IP address of a device of the content provider 40 but rather the IP address of the intermediate management device 30 (denoted by INT IP@), so that this device can take charge of managing delivery of the requested content C1.

Once equipped with the IP address of the device 30, the terminal uses this IP address to send (step E4) this device 30 a request to obtain the content requested by the user, this request comprising particularly an identifier of this content, the source IP address of this request (i.e. the IP address allocated to the terminal 10 by the network 20 on its attachment, denoted by UE IP@) and the destination address of this request (INT IP@). This request may typically be an http GET request (for example in the form "http GET www.youtube.com/C1; source: UE IP@; destination: INT IP@").

Having received this request, the intermediate management device 30 can obtain from the content provider/distributor 40 a file MF, called "resolution file", listing the various encoding bit rates provided by the provider/distributor 40 for this content C1, as long as the device 30 does not already have this file MF (or if it wishes to update it, for example when it has had this file for some time). Such a resolution file may typically be a file of "Manifest File" type, used in http adaptive streaming and usually intended to be transmitted directly to the mobile terminal requesting the content. To do this, the device 30 sends (step E5) a device 41 belonging to the content provider/distributor 40 concerned, which is capable of providing the content C1, a request identifying the content C1 and aiming to obtain a resolution file MF corresponding to this content C1. The device 41 responds to this request (step E6) by transmitting to the device 30 the file MF containing the various resolutions available for this content C1 in particular.

In one possible format of this resolution file, each available encoding bit rate for the content C1 is associated with a series of particular Internet addresses (URLs) pointing to the various successive segments S1, S2 . . . of the content C1 encoded in this particular format.

Thus, for a content C1 with a duration of 40 seconds, divided into four data segments, S1 to S4 of 10 seconds available in three different resolutions, i.e. with three encoding bit rates 512 kb/s, 1024 kb/s and 2048 kb/s, the resolution file can take the following form:

| Requested content | Encoding bit rate | Address at which to retrieve the segment |
| --- | --- | --- |
| C1 | 512 kb/s | S1: www.youtube.com/C1/stream512/S1 |
| | | S2: www.youtube.com/C1/stream512/S2 |
| | | S3: www.youtube.com/C1/stream512/S3 |
| | | S4: www.youtube.com/C1/stream512/S4 |
| | 1024 kb/s | S1: www.youtube.com/C1/stream1024/S1 |
| | | S2: www.youtube.com/C1/stream1024/S2 |
| | | S3: www.youtube.com/C1/stream1024/S3 |
| | | S4: www.youtube.com/C1/stream1024/S4 |
| | 2048 kb/s | S1: www.youtube.com/C1/stream2048/S1 |
| | | S2: www.youtube.com/C1/stream2048/S2 |
| | | S3: www.youtube.com/C1/stream2048/S3 |
| | | S4: www.youtube.com/C1/stream2048/S4 |

Having received this file MF, the device 30 stores this file (step E7).

The device 30 then sends (step E8), to the node 25 for applying quality of service rules of the network 20, a request aiming to obtain information relating to the available bandwidth on the network link(s) connecting the terminal 10 to the network access gateway 23 to which it is attached.

Insofar as the node 25 does not already have this information, it retransmits this request (possibly in a modified format) to the network access gateway 23 (step E9). On receiving this request, the network access gateway 23 determines the available bandwidth on the network link(s) that connects it to the terminal 10, when it does not already have this information, and returns a response message containing this information (step E10) to the node 25. Once it has the information relating to the bandwidth on the network link(s) between the terminal 10 and the network access gateway 23, the node 25 transmits a response message containing this information (step E11) to the device 30.

The device 30 then has the various encoding bit rates available for the packets forming the content C1, and the available bandwidth on the network link(s) to the terminal 10. The device 30 can then use this information to select (step E12) the encoding bit rate RES (and therefore the resolution quality of the content C1) to be used on the basis of the available bandwidth in the network.

At this stage of the method, in this embodiment, it is a matter of determining the initial encoding bit rate of the data stream corresponding to the content C1, that is to say the resolution of the first data segment S1 of this stream (this segment S1 comprising the first n packets of the content C1) even before the sending of this data stream has started, so as to provide an optimum quality of experience from this first packet onward.

This selection can consist particularly in choosing, from among all the available encoding bit rates, the highest encoding bit rate that is lower than the maximum available bandwidth on a network link between the terminal 10 and the network access gateway 23. Thus, with the three encoding bit rates 512 kb/s, 1024 kb/s and 2048 kb/s, a single active network link and an available bandwidth of 1500 kb/s on this link, it is the second encoding bit rate of 1024 kb/s (therefore of average quality) that is selected.

Once the encoding bit rate has been selected, the device 30 sends (step E14) to the device 41 a request aiming to trigger the sending (step E18), by the service provider 41, of the first segment S1, encoded using the encoding bit rate selected by the device 30, of the content C1 to the terminal 10. The sending of this segment S1 can transit through the management device 30 as illustrated in FIG. 2, which then plays the part of a transparent proxy that can also have the role of enhancing or recording the transmitted segments and/or packets (with the possible aim of billing), or can be effected directly via the network access gateway 23 without transiting through the device 30.

Moreover, the device 30 can also determine (step E13) a quality of service rule (denoted by QoS) to be applied on the network link between the network access gateway 23 and the terminal 10 on transmission of the data packets encoded using the selected encoding bit rate.

This quality of service rule can particularly comprise an instruction to reserve a bandwidth allocated to the transmission of packets encoded using the selected encoding bit rate, this reserved bandwidth being determined on the basis of the encoding bit rate selected previously and the available bandwidth on the network link under consideration. Thus, by rechoosing an encoding bit rate of 1024 kb/s for a link with an available bandwidth of 1500 kb/s, the rule can provide an instruction to reserve a bandwidth corresponding to the encoding bit rate (1024 kb/s), with a possible increase by a margin (e.g. 1100 kb/s). This quality of service rule may also comprise a session identifier, for example made up of the IP address of the terminal 10 (e.g. the address UE IP@) and the URL of the requested content (e.g. www.youtube.com/C1), so as to allow the network access gateway 23 to identify the session in question for which this rule should be applied.

Once this quality of service rule QoS has been determined, the device 30 transmits a request comprising this rule to the node 25 for applying quality of service rules (step E15). Following reception of this quality of service rule to be applied, the node 25 firstly triggers setup of a new bearer channel dedicated to transmission of the content C1 to the terminal 10. This new bearer channel is particularly a "PDP Context" in the case of a GPRS network or an "EPS Bearer" in the case of a 4G network.

The node 25 secondly translates the quality of service rule to be applied into a set of quality of service parameters to be applied, on this new bearer channel, on transmission of the data packets corresponding to the content C1 and transmits (step E16) a message comprising these parameters to the network access gateway 23 (in this case illustrated as being a GGSN gateway, without being limited to this single case), so as to instruct this gateway 23 to set up (step E17) the bearer channel by applying these quality of service parameters on transmission of the packets of the content C1. These parameters are, for example, the type or class of traffic, the guaranteed minimum bit rate (GBR) for the bearer channel dedicated to the transmission of the content C1 and the maximum bit rate (MBR) for this bearer channel. In the previous example, a guaranteed bit rate GBE can be considered to be equal to the selected encoding bit rate (1024 kb/s) and a maximum bit rate MBR can be considered to be equal to the allocated bandwidth (1100 kb/s).

Subsequently, the device 30 sends a second request to the Internet address of the service provider 41 corresponding to the chosen encoding bit rate RES, so as to trigger the sending of the second segment S2, still encoded using this same encoding bit rate RES, of the content C1 to the terminal 10, and so on, until after there has been an update to the available resolutions or modification of the transmission conditions in the network, up to the last segment of the content C1.

Once the session for delivering the content C1 has finished, the device 30 can generate a billing data file (CDR for charging data record in English), or enhance such a file that already exists, with certain information relating to this session, such as the session identifier (e.g. the identifier of the terminal 10 and the Internet address of the content C1), the session duration (in seconds) and the frequency of update for the quality of service rules (equal to 1, for example, if there has been only a single update at the beginning of this session), for example. This billing data file can then be transmitted, for example on a monthly basis, to a device dedicated to billing in the network 20, so that the latter can make out a bill on the basis of these data and transmit said bill to the content provider/distributor 40.

Figure 3:
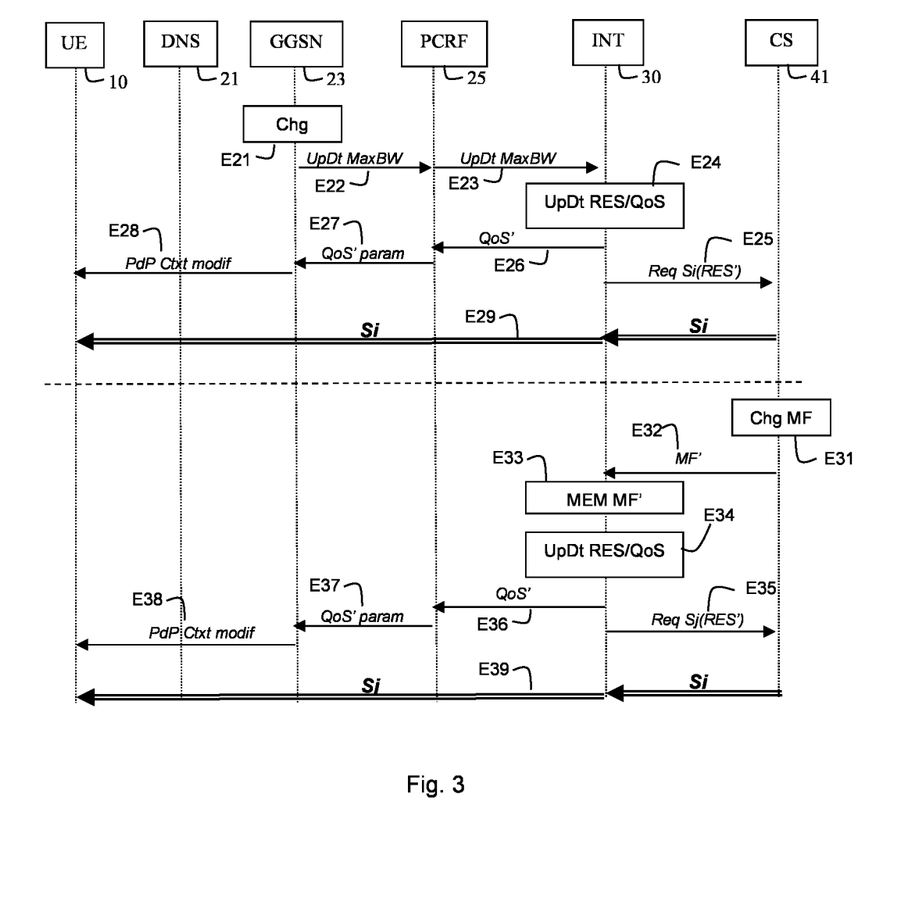
FIG. 3 illustrates other aspects of the method for transmitting a digital content to a mobile terminal according to this first embodiment.

Reference will now be made to FIG. 3, which illustrates other aspects of the method for transmitting the digital content C1 to a mobile terminal according to the first embodiment.

In this case, the situation is one in which, as some data segments of the content C1 have already been transmitted to the terminal 10, an event takes place on the network 20 that brings about a modification to the available bandwidth on the network link used to deliver the content C1 to the terminal 10.

This event is detected by the network access gateway 23 (step E21), which then determines the updated available bandwidth and transmits (step E22) to the node 25 an update notification message for the available bandwidth, comprising a piece of information characterizing this available updated bandwidth. The node 25 retransmits (step E23) this message, possibly in a modified format, to the management device 30.

On the basis of this updated bandwidth, the device 30 determines (step E24) the encoding bit rate to be applied to the next packets that have not yet been transmitted for the content C1 (step E24), on an update process for this bandwidth.

In particular, if the updated available bandwidth is lower than the available bandwidth considered previously and no longer allows the transmission of packets encoded using the encoding bit rate that is being applied, then the device 30 selects a lower encoding bit rate RES' (and therefore lowers the quality of the resolution of the data stream) that is compatible with the updated bandwidth (typically the highest encoding bit rate among the available encoding bit rates that are lower than the updated bandwidth). Thus, with the three available encoding bit rates 512 kb/s, 1024 kb/s and 2048 kb/s, if the available bandwidth changes from 1500 kb/s to 700 kb/s, then the device 30 selects an updated encoding bit rate RES' of 512 kb/s.

Conversely, if the updated bandwidth has increased in relation to the previously available bandwidth, the device 30 can select a higher encoding bit rate (and therefore increase the resolution quality of the data stream) lower than the updated available bandwidth. Thus, still with the three available encoding bit rates 512 kb/s, 1024 kb/s and 2048 kb/s, if the available bandwidth changes from 1500 kb/s to 3000 kb/s, then the device 30 selects an updated encoding bit rate RES' of 2048 kb/s.

Insofar as a new encoding bit rate RES' has been selected by the device 30, the latter sends a request to a URL corresponding to this new encoding bit rate (step E25), so as to trigger the sending of the next data segment Si, encoded in accordance with this new encoding bit rate RES' (step E29), to the terminal 10.

Furthermore, when the encoding bit rate is updated, the device 30 can also determine an updated quality of service rule QoS' to be applied, on the bearer channel dedicated to delivery of the content C1 to the terminal 10, to the segments of this content that have not yet been transmitted, during an update process for the quality of service. The device 30 transmits (step E26) a message comprising this updated rule QoS' to the node 25, which translates this updated rule into a set of updated quality of service parameters to be applied, on the bearer channel, on transmission of the packets of the content C1 that have not yet been transmitted and transmits (step E27) a message comprising these updated parameters to the network access gateway 23, so as to instruct this gateway 23 to modify (step E28) the bearer channel already dedicated to delivery of the content C1, by applying these updated parameters on delivery of the rest of the content C1.

According to another aspect, the device 41 can send (step E32) to the device 30 an updated resolution file MF', following modification of this file (step E31) by the device 41, typically on withdrawal of an encoding bit rate from among the available encoding bit rates for the content C1 (for example following the appearance of an excess load, and therefore the degradation of the transmission bit rate, on/of the device 41 intended to provide the content C1 or when an encoding bit rate for the content C1 is no longer available on the device 41), or conversely on addition of an encoding bit rate to the available encoding bit rates for the content C1 (for example following the improvement in the load, and therefore the increase in the transmission bit rate, on/of the device 41 intended to provide the content C1).

In this case, this updated file MF' is stored (step E33) by the device 30, and this device 30 selects (step E34), on the basis of this updated file MF', an encoding bit rate to be applied to the segments of the content C1 that have not yet been transmitted, during an update process for the encoding bit rate.

In particular, when the device 30 determines that a new encoding bit rate RES', which is higher than that being applied, has become available in the updated file MF' in relation to the file MF used previously, and that said new encoding bit rate is lower than the available bandwidth on the network link to the terminal 10, then the device 30 selects this new encoding bit rate in order to increase the resolution of the transmitted content, and therefore to increase the quality of experience of the user. Conversely, if the device 30 determines that the encoding bit rate being used is no longer available in the updated file, then the device 30 selects another encoding bit rate corresponding to the higher encoding bit rate, from among the encoding bit rates still available that are indicated in the updated file, which other encoding bit rate is lower than the available bandwidth, so as to minimize the degradation in the quality of the experience of the user.

Insofar as a new encoding bit rate RES' has been selected by the device 30 following the update of the resolution file, the device 30 sends (step E35) a request to the device 41 containing an indicator relating to the new selected encoding bit rate RES' (typically a URL corresponding to this new encoding bit rate for the segment Sj to be transmitted) so as to trigger the sending of the next data segment Sj, encoded in accordance with this new encoding bit rate RES' (step E39), to the terminal 10, in a manner similar to preceding steps E25 and E29.

Moreover, still when a new encoding bit rate RES' is selected, the device 30 can advantageously determine an updated quality of service rule QoS' to be applied, on the bearer channel dedicated to delivery of the content C1, to the segments Sj of this content that have not yet been transmitted, during an update process for the quality of service, this updated rule taking account of the new encoding bit rate to be applied. When this is the case, the device 30 transmits (step E36) this updated quality of service rule QoS' to the node 25, so as to trigger modification of the bearer channel dedicated to the transmission of the content C1 (steps E37,E38), in a manner similar to preceding steps E26 to E28.

Figure 4:
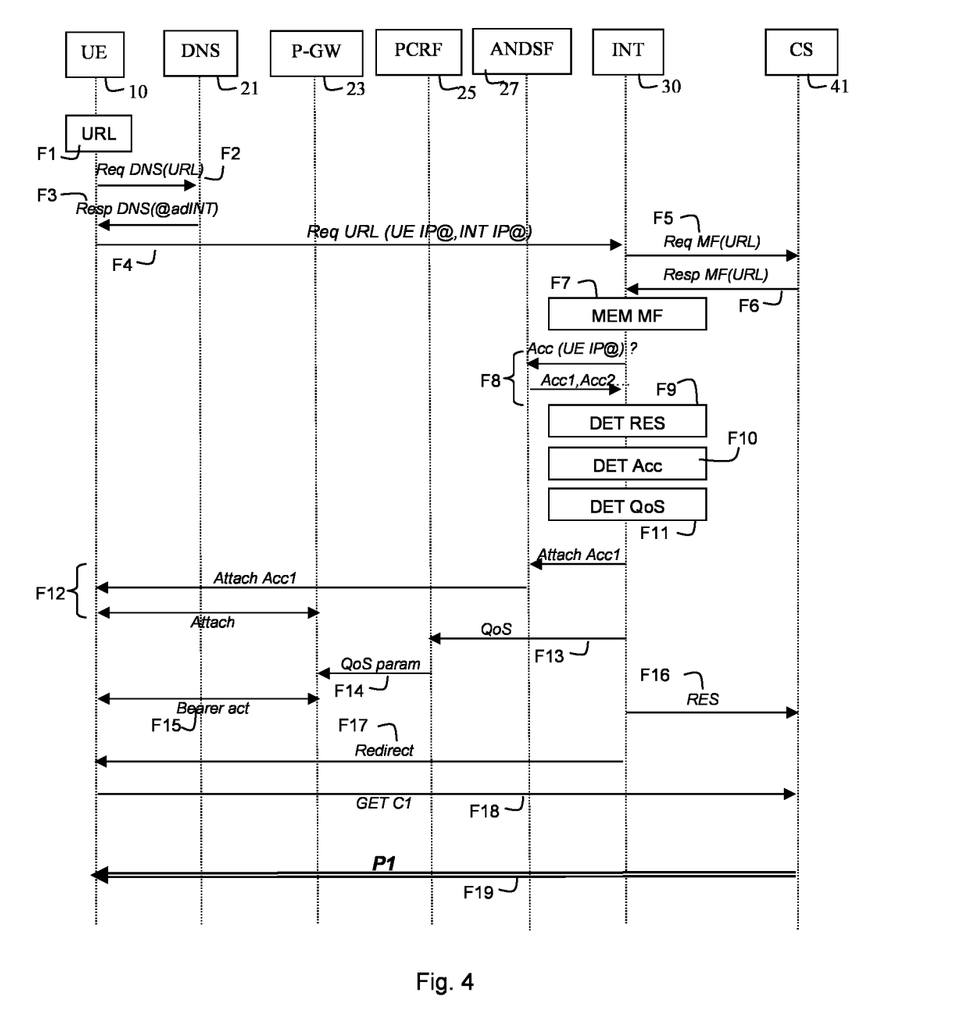
FIG. 4 illustrates a method for transmitting a digital content to a mobile terminal according to a second embodiment of the invention.

Reference will now be made to FIG. 4, which illustrates a method for transmitting a digital content to a mobile terminal according to a second embodiment.

In this second embodiment, consideration is given to the particular case in which the terminal 10 is attached via one or more access networks to a network access gateway 23 for a core network having, moreover, a server 27 implementing an access network discovery and selection function. This is particularly the case when the gateway 23 is a P-GW gateway belonging to a 4G core network (EPC for "Evolved Packet Core" in English) comprising an ANDSF server, comparable to a server 27 of this kind and allowing the terminal 10 to discover and select access networks that are present within its context but to which it is not necessarily attached. Within such a 4G context, multiple network links transiting through various access networks can be used to transmit to the terminal 10 packets belonging to one and the same data stream corresponding to a given media session, via the P-GW gateway.

In this second embodiment, consideration is also given to the fact that the management device 30 plays purely a signaling role and that, therefore, the data packets do not transit via this device 30, in contrast to the preceding embodiment.

Consideration is moreover given to the fact that messages indicating the resolution to be used are sent to the content provider/distributor 40 not for each data segment to be transmitted, as is the case for the first embodiment, but at the start of a session and/or on the occurrence of a specific event on the network 20 or on the content provider/distributor 40. Consequently, the content C1 can then be transmitted by means of a stream of data packets P1, P2 . . . , rather than by data segments, which is the case illustrated in FIG. 4.

The triggering of the method (step F1), the direction of the request to provide content C1 from the mobile terminal 10 to the management device 30 by means of an address resolution server 21 (steps F2-F4), and the possible obtainment from a device 41 intended to provide the content C1 and the storage of the resolution file MF (steps F5-F7) are similar to steps E1 to E7 described previously.

Once it has the resolution file for the requested content C1, the device 30 obtains (step F8) information relating to the available bandwidths on the various network links by means of which the mobile terminal is attached to the network 20, which are called "active network links". The device 30 can also advantageously obtain information relating to the available bandwidths on various "potential network links", in this case denoting network links by means of which the mobile terminal is not attached to the network 20, but is within a context in which it could be (for example because the mobile terminal is under the cover of an access point of an access network, without being attached thereto). These various network links, whether they be actually in use or just potentially usable, can pertain to different access technologies (3G, 4G, Wifi, Wimax) and to different access networks.

To do this, when the network 20 comprises an access network discovery and selection server 27 having, for a given mobile terminal, information about available bandwidth for all the network links by means of which the terminal is attached to the network 20, and for the network links by means of which it can potentially attach itself to this network 20, the entity 30 talks to this server 27 in order to obtain this information specific to the terminal 10, by sending it a request to which the server 27 responds with a message comprising this information.

Once it has this available bandwidth information, for all the active network links (or even for the potential network links) to the terminal 10, the management device 30 selects (step F9), from among the network links for which it has received available bandwidth information, the network link having the highest available bandwidth.

Having selected a network link, the management device 30 selects (step F10), from among the available encoding bit rates for the requested content, an encoding bit rate RES corresponding to the highest encoding bit rate that is lower than the available bandwidth of the selected link.

Thus, in the case of two network links having available bandwidths of 1000 and 2000 kb/s and a content provided in accordance with three available encoding bit rates of 512, 1024 and 2048 kb/s, the selected network link is that which has an available bandwidth of 2000 kb/s and the selected encoding bit rate is 1024 kb/s.

If the terminal 10 is already attached to the selected network link, the management device 30 determines (step F11), on the basis of the selected encoding bit rate RES, a quality of service rule QoS to be applied to this network link. The management device 30 then transmits (step F13) a request comprising this quality of service rule QoS to the node for applying quality of service rules 25 of the network 20, so as to trigger the sending (step F14), from this node 25 to the network access gateway 23, of a message comprising quality of service parameters deduced from the quality of service rule, as explained previously, these parameters needing to be applied to the selected network link so as to reserve a bandwidth that is compatible with the encoding bit rate RES on this network link.

If, conversely, the selected network link is a potential network link (i.e. a nonactive network link by means of which the terminal 10 is not yet attached to the network 20, but could be), the management device 30 transmits, to the access network discovery and selection server 27, a request providing instruction to trigger an attachment procedure based on the selected network link between the mobile terminal and a network access gateway 23 of the communication network, after having determined (step F11), on the basis of this selected encoding bit rate, a quality of service rule QoS to be applied to this network link. Following reception of this instruction, the server 27 transmits an attachment request to the terminal 10 so that the latter attaches itself to the gateway 23 (step F12). The quality of service rule QoS is also transmitted to the node 25 and used in accordance with steps F13 and F14 described previously, so as to trigger activation of a bearer channel (EPS bearer in English) dedicated to transmission of the packets on the selected and recently set-up network link (step F15).

Apart from these various steps, when it has selected an encoding bit rate RES to be applied, the management device 30 transmits (step F16) a message comprising this encoding bit rate RES to the device 41 of the content provider/distributor 40, so as to tell it to use this selected encoding bit rate for the packets Pi to be transmitted to the terminal 10.

In this case, as an alternative to what has been proposed in FIG. 2, the message sent to the device 41 is a request to select data packets encoded using the selected encoding bit rate, when the device 41 subsequently receives from the terminal 10 a transmission request for these data packets. In other words, the device 41 does not directly transmit the packets at the selected encoding bit rate to the terminal 10 after having received this request, but expects to receive a request from the terminal 10 to do so. Furthermore, the management device 30 transmits (step F17) to the terminal 10 a message instructing it to redirect (step F18) a request to transmit data packets from the mobile terminal to the device 41. Reception of this redirected request brings about transmission to the terminal 10, by the device 41, of the packets P1, . . . at the selected encoding bit rate (F19).

Figure 5:
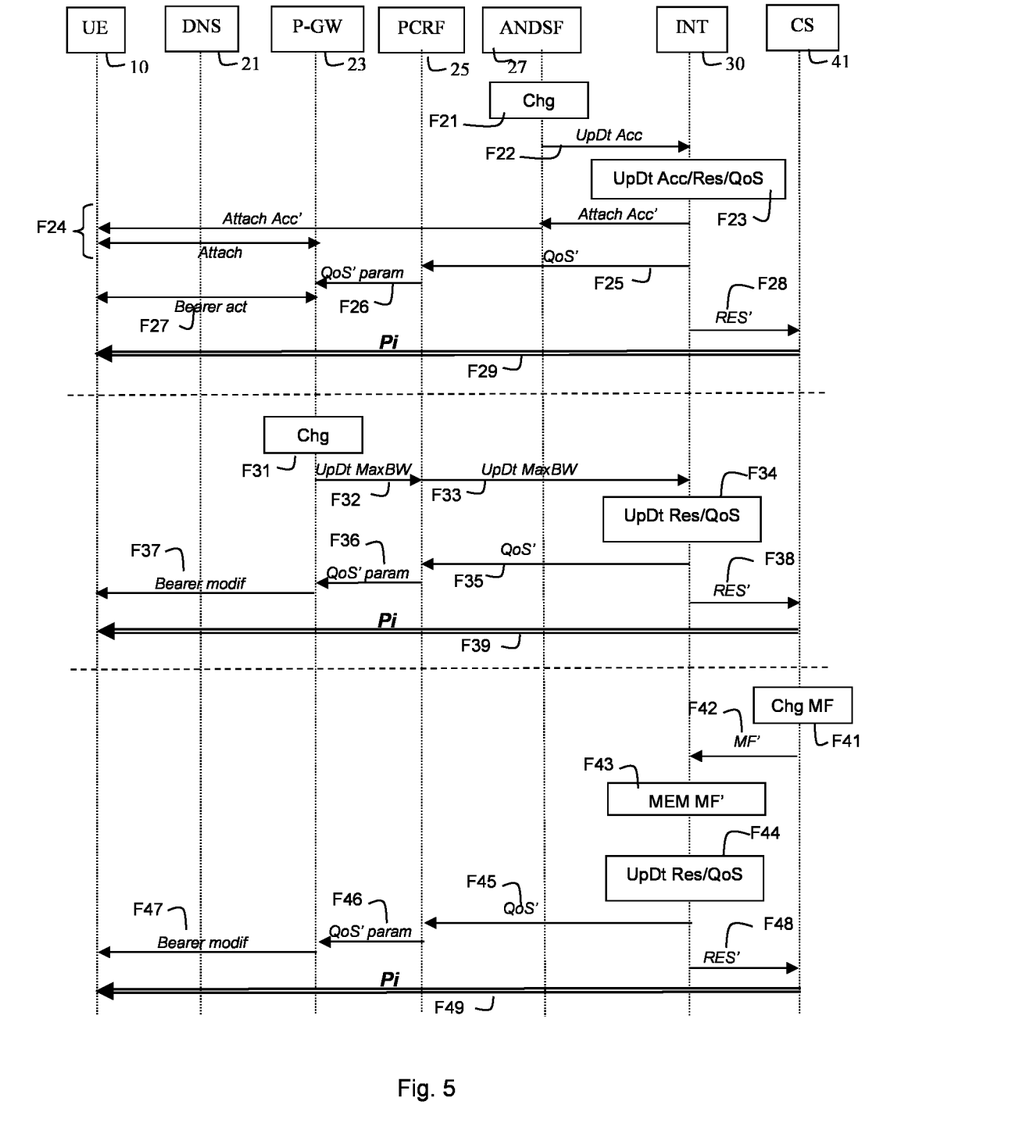
FIG. 5 illustrates other aspects of the method for transmitting a digital content to a mobile terminal according to this second embodiment.

Reference will now be made to FIG. 5, which illustrates other aspects of the method for transmitting digital content to a mobile terminal according to the second embodiment.

The initial situation is one in which as some data packets of the content C1 have already been transmitted to the terminal 10, an event takes place on the network 20 that brings about a modification on the network links between the terminal 10 and the gateway 23 has taken place. This modification may, by way of example, manifest itself through the appearance of a new access within the context of the terminal 10, i.e. a new network link to the terminal 10, via a new access network.

This event is detected by the access network discovery and selection server 27 (step F21), which determines the available network links within the context in which the user of the terminal 10 finds himself, and transmits (step F22) to the node 25 a notification message regarding the available bandwidths on these different links.

On the basis of the information received on the available bandwidths for the various available network links, the device 30 selects (step F23) the network link having the highest available bandwidth, and a highest available encoding bit rate that is lower than this available bandwidth, in a manner similar to steps F9 and F10 discussed previously. If the selected network link continues to be the network link used previously for transmitting data packets of the content C1, no network link modification takes place, the management device 30 then only transmitting to the device 41 an updated encoding bit rate RES' when it proves different than the bit rate RES used previously.

If the selected network link is an active network link, different than the network link used previously for transmitting data packets of the content C1, by means of which the terminal 10 is already attached to the gateway 23, the device 30 determines an updated quality of service rule QoS' and transmits it (step F25) to the node for applying quality of service rules 25, so that the latter deduced therefrom quality of service parameters that it transmits (step F26) to the network access gateway 23, in order for the latter to trigger activation of a new bearer channel (EPS bearer) dedicated to transmission of packets of C1 (step F27) on the new selected network link, and reservation of a bandwidth that is compatible with the selected encoding bit rate on this new link.

Finally, if the selected network link is a potential network link by means of which the terminal 10 is not yet attached to the gateway 23, the device 30 instructs the access network discovery and selection server 27 to trigger an attachment between the terminal 10 and an access network gateway 23 by means of this selected network link (step F24). The device 30 moreover determines an updated quality of service rule QoS' and transmits it (step F25) to the node for applying quality of service rules 25, so that the latter deduces therefrom quality of service parameters that it transmits (step F26) to the network access gateway 23, in order for the latter to trigger activation of a new bearer channel (EPS bearer) dedicated to transmission of packets of C1 (step F27) on the new selected network link, and reservation of a bandwidth that is compatible with the selected encoding bit rate on this new link.

The management equipment 30 can then transmit (step F28) an instruction telling the device 41 to transmit (step F29) the next packets Pi of the content C1, which are encoded in accordance with the updated encoding bit rate RES', to the terminal 10 via the new selected network link.

According to a second aspect illustrated in FIG. 5, an event modifying the bandwidth of the network link used to transmit the packets of the content C1 can take place. Such an event is detected (step F31) by the network access gateway 23, which notifies (steps F32,F33) the device 30 by means of the device 25, so that the device is able to determine (step F34) any update to the encoding bit rate RES to be applied to the next packets of the content C1 (steps F38,F39), and to the quality of service QoS to be applied to the bearer channel dedicated to transmission of this content (steps F35-F37). If need be, if modification of the bandwidth of the network link used leads to another network link, by means of which the terminal 10 can attach itself to the network 20, having a better available bandwidth, a procedure for attachment of the terminal 10 to the network 20 by means of this other network link (not illustrated) can be triggered, in a manner similar to steps F12 and F24.

Finally, according to a third aspect illustrated in FIG. 5, a modification to the resolution file MF can take place as discussed previously (step F41), in which case an updated file MF' is transmitted by the device 41 to the device 30 (step F42) so as to be stored therein (step F43). The device 30 can then determine (step F44) any update to the encoding bit rate RES to be applied to the next packets of the content C1 (steps F48,F49), and to the quality of service QoS to be applied to the bearer channel dedicated to transmission of this content (steps F45-F47). If need be, if withdrawal or addition of an encoding bit rate in the updated file MF' leads to another network link, by means of which the terminal 10 could attach itself to the network 20, being more optimum in relation to the encoding bit rates of the file MF', a procedure for attachment of the terminal 10 to the network 20 by means of this other network link (not shown) can be triggered, in a manner similar to steps F12 and F24.

Figure 6:
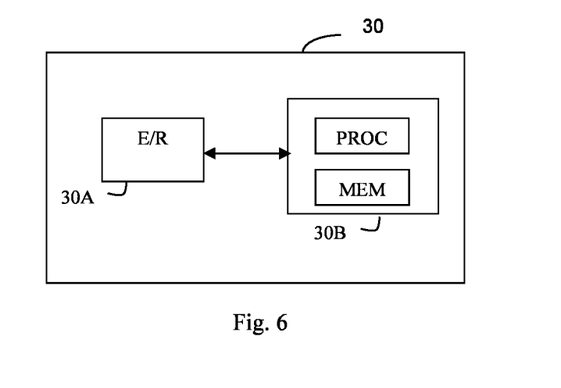
FIG. 6 schematically illustrates a device for managing transmission of a digital content according to an embodiment of the invention.

Reference will now be made to FIG. 6, which illustrates the device 30 for managing transmission of a digital content according to an embodiment of the invention.

Such a management device 30 particularly comprises:

- a communication module 30A, designed to communicate with other devices of the network 20 or of the content provider/distributor 40.
- a processing module 30B, designed firstly to receive messages from other devices, by means of the module 30A, and to instruct the module 30A to send messages to other devices.

The communication module 30A is designed to obtain, from a device of the network 20, (a) piece(s) of information relating to the available bandwidth on one or more network link(s) from the network 20 to the mobile terminal 10 and to communicate this information to the processing module 30B. It is also designed to send, on instruction from the processing module 30B, to the device 41 intended to provide a digital content a message comprising an indication relating to the selected encoding bit rate RES, this message being used to instruct this device 41 to use this encoding bit rate RES when it sends data packets, encoded using this encoding bit rate RES, to the terminal on one of the aforementioned network links.

The processing module 30B is configured to select, on the basis of the information relating to the available bandwidth on one or more link(s) from the network 20 to the mobile terminal 10 that is obtained by the module 30A, the encoding bit rate RES to be applied to one or more data packets to be transmitted to the terminal 10.

In other words, the modules 30A and 30B are designed to implement the method described previously.

The invention is implemented by means of software and/or hardware components. With this in mind, the term "module" may correspond, in this document, either to a software component or to a hardware component, or even to a set of hardware and/or software components, which is capable of implementing a function or a set of functions, according to what is described previously for the module in question.

A software component corresponds to one or more computer programs, one or more subroutines of a program or, more generally, to any element of a program or of a piece of software. Such a software component is stored in a memory (denoted by MEM in FIG. 4), and then loaded and executed by a data processor (denoted by PROC in FIG. 4) of the device 30, which may access the hardware resources of this device 30 (memories, recording media, communication buses, electronic input/output cards, user interfaces, etc.). In the same way, a hardware component corresponds to any element of a hardware assembly. It may be a programmable or nonprogrammable hardware component, with or without an integrated processor for executing software. By way of example, it is an integrated circuit, a chip card, an electronic card for executing firmware, etc.

The module 30A is thus typically implemented in the form of a hardware component, for example a modem, a network card, or even an optical transceiver, depending on the type of interface in question between the device 30, the network 20 and the device 41. The module 30B is itself typically implemented in the form of a software component comprising software instructions for executing the steps of the method described previously, which are implemented by a management device 30.

The invention therefore also concerns:
  a program for such a management device 30, comprising program code instructions that are intended to control the execution of the steps of the method described previously when said program is executed by this management device 30;

a recording medium, readable by such a device 30, on which is recorded the program for this device.

The software modules may be stored in or transmitted by a data storage medium. This may be a hardware storage medium (for example a CD-ROM, a floppy disk or a hard disk) or indeed a transmission medium such as an electrical, optical or radio signal, or a telecommunication network.

Of course, the invention is not limited to the embodiments described and represented above, on the basis of which other embodiments and other forms of implementation are foreseeable, without, however, departing from the framework of the invention.

Thus, the management device 30 has been presented as being a third-party device in relation to the network 20 of a telecommunications operator and in relation to the content provider/distributor 40, and therefore located outside the realms managed by these, so as to guarantee a certain degree of neutrality in the management of the information gathered from either side. It is, however, also possible for this device 30 to be a device belonging to the network 20, and therefore to be managed directly by the operator of the network 20, or alternatively for it to belong to the realm of the content provider or distributor 40, and therefore to be managed thereby, which is appropriate when the telecommunications operator and the content provider form one and the same entity or have a high degree of mutual trust.

Moreover, although a transmission of the content by segments has been illustrated in the first embodiment, while a transmission of the content by packet streams has been illustrated in the second embodiment, these two methods of transmission are interchangeable and can be used in the various embodiments of the invention.

The invention claimed is:

1. A method for transmitting a digital content, composed of a plurality of data packets, to a mobile terminal, the method comprising the following steps implemented by a management device:
    attaching the mobile terminal to a mobile access network via an access point or a base station of said mobile access network;
    setting up at least one network link between the mobile terminal and a network access gateway of a communication network, said network access gateway allowing interaction between said communication network and an external packet network, said at least one network link being set up through said mobile access network and said communication network;
    obtaining, by said management device, from a node for applying quality of service rules in the communication network, information about the available bandwidth on said at least one network link set up between the mobile terminal and a network access gateway through said mobile access network and said communication network, wherein said node for applying quality of service rules in the communication network is distinct from said management device;
    selecting, by said management device, on the basis of said information about the available bandwidth on said at least one network link set up between the mobile terminal and a network access gateway through said mobile access network and said communication network, an encoding bit rate to be used for at least one of said data packets; and
    sending, by said management device, to a device intended to provide the digital content, a message indicating the selected encoding bit rate, so as to instruct said device intended to provide the digital content to transmit to the mobile terminal at least one of said data packets, encoded using the selected encoding bit rate, on one of said network links.

2. The method as claimed in claim 1, further comprising:
    determining, on the basis of the selected encoding bit rate, a quality of service rule to be applied to the network link on which the at least one data packet encoded by the selected encoding bit rate is to be transmitted; and
    sending the quality of service rule to a node for applying quality of service rules of the communication network, so as to trigger the sending, from the node for applying quality of service rules to a network access gateway, of at least one quality of service parameter, deduced from the quality of service rule, to be applied to the network link on which the at least one data packet encoded using the selected encoding bit rate is to be transmitted.

3. The method as claimed in claim 1, in which said at least one packet encoded using the selected encoding bit rate is a data segment of the digital content comprising the first packet of said content, the steps of the method being implemented by the management device following reception of a request to provide the content from the mobile terminal.

4. The method as claimed in claim 1, further comprising the management device obtaining a resolution file from the device intended to provide the digital content, the resolution file indicating a plurality of available encoding bit rates for the packets of the digital content, the encoding bit rate to be used being selected from among the plurality of available encoding bit rates.

5. The method as claimed in claim 1, in which:
    the obtainment step consists in obtaining, from an access network discovery and selection server of the communication network, a plurality of pieces of information relating to the available bandwidths for a plurality of network links from the network to the terminal,
    the method further comprises the selection, from among said network links, of the network link having the highest available bandwidth, and
    the step of selection of the encoding bit rate consists in selecting, from among a set of available encoding bit rates for the digital content, the highest encoding bit rate that is lower than the available bandwidth of the selected network link.

6. The method as claimed in claim 5, in which, when the selected network link is a network link by means of which the mobile terminal is not attached to the mobile network, the method further comprises the sending, to the access network discovery and selection server, of an instruction for triggering an attachment procedure by means of the selected network link between the mobile terminal and a network access gateway of the communication network.

7. The method as claimed in claim 1, in which the message sent to the device intended to provide the digital content is a request to send to the mobile terminal at least one of said data packets, encoded using the selected encoding bit rate, on one of said network links.

8. The method as claimed in claim 1, in which the message sent to the device intended to provide the digital content is a request to select at least one data packet encoded using the selected encoding bit rate when the device intended to provide the digital content receives from the mobile terminal a request to transmit said data packet, the method further comprising the sending, from the management device to the mobile terminal, of a message providing instruction to redirect a request to transmit data packets from the mobile terminal to the device intended to provide the digital content.

9. A management device for managing transmission of a digital content composed of a plurality of data packets to a mobile terminal attached to a network access gateway allowing interaction between a communication network and an external packet network, comprising:

- communication means that are capable of obtaining, from a node for applying quality of service rules in the communication network, information about the available bandwidth on at least one network link set up between the mobile terminal and a network access gateway of the communication network, wherein said at least one network link is set up through said communication network and a mobile access network to which the mobile is attached to via an access point or a base station of said mobile access network;
- said communication means being further configured to send, to a device intended to provide the digital content, a message indicating an encoding bit rate to be used for at least one of said data packets, so as to instruct said device intended to provide the digital content to transmit to the mobile terminal at least one of said data packets, encoded using the selected encoding bit rate, on one of said network links; and
- processing means that are configured to select, on the basis of said information relating to the bandwidth, the encoding bit rate to be used for said at least one data packet.

10. A non-transitory recording medium, readable by a device for managing transmission of a digital content, on which is recorded a computer program comprising code instructions intended for implementation of steps of a method when said computer program is executed by processing means of a device for managing transmission of a digital content, the method for transmitting a digital content, composed of a plurality of data packets, to a mobile terminal, the method comprising the following steps implemented by a management device:

- attaching the mobile terminal to a mobile access network via an access point or a base station of said mobile access network;
- setting up at least one network link between the mobile terminal and a network access gateway of a communication network, said network access gateway allowing interaction between said communication network and an external packet network, said at least one network link being set up through said mobile access network and said communication network;
- obtaining, by said management device, from a node for applying quality of service rules in the communication network, information about the available bandwidth on said at least one network link set up between the mobile terminal and a network access gateway through said mobile access network and said communication network, wherein said node for applying quality of service rules in the communication network is distinct from said management device;
- selecting, by said management device, on the basis of said information about the available bandwidth on said at least one network link set up between the mobile terminal and a network access gateway through said mobile access network and said communication network, an encoding bit rate to be used for at least one of said data packets; and
- sending, by said management device, to a device intended to provide the digital content, a message indicating the selected encoding bit rate, so as to instruct said device intended to provide the digital content to transmit to the mobile terminal at least one of said data packets, encoded using the selected encoding bit rate, on one of said network links.

* * * * *